United States Patent
Buckl

(10) Patent No.: US 10,688,846 B2
(45) Date of Patent: Jun. 23, 2020

(54) HEAT EXCHANGER AND VEHICLE HEATING DEVICE COMPRISING A HEAT EXCHANGER

(71) Applicant: Webasto SE, Stockdorf (DE)

(72) Inventor: Stephan Buckl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 87 days.

(21) Appl. No.: 15/762,145

(22) PCT Filed: Sep. 16, 2016

(86) PCT No.: PCT/EP2016/072031
§ 371 (c)(1),
(2) Date: Mar. 22, 2018

(87) PCT Pub. No.: WO2017/050661
PCT Pub. Date: Mar. 30, 2017

(65) Prior Publication Data
US 2018/0272837 A1    Sep. 27, 2018

(30) Foreign Application Priority Data
Sep. 25, 2015   (DE) .................. 10 2015 012 557

(51) Int. Cl.
*B60H 1/00* (2006.01)
*G01K 1/14* (2006.01)
(Continued)

(52) U.S. Cl.
CPC ....... *B60H 1/00792* (2013.01); *B60H 1/2221* (2013.01); *F24H 1/121* (2013.01);
(Continued)

(58) Field of Classification Search
CPC .............. B60H 1/00792; B60H 1/2221; B60H 2001/2246; F24H 1/121; F24H 3/0405;
(Continued)

(56) References Cited

U.S. PATENT DOCUMENTS 941,215 A * 11/1909 Wade ...................... F24H 1/121
    392/494
4,343,988 A * 8/1982 Roller ................... A47J 31/545
    165/165
(Continued)

FOREIGN PATENT DOCUMENTS

DE          10051755 C1   4/2002
DE       102011057105 A1   7/2013
(Continued)

OTHER PUBLICATIONS

EPO; International Search Report and Written Opinion for PCT/EP2016/072031, dated Jan. 24, 2017.

*Primary Examiner* — Steven B McAllister
*Assistant Examiner* — Daniel E. Namay
(74) *Attorney, Agent, or Firm* — Quarles & Brady LLP

(57) ABSTRACT

A heat exchanger includes a temperature sensor for a vehicle heating device, a heat input surface, an electrical heating element arranged on the heat input surface, and a heat output surface. The temperature sensor is arranged in a depression on the heat output surface.

10 Claims, 4 Drawing Sheets

(51) Int. Cl.
*G01K 1/16* (2006.01)
*F24H 1/12* (2006.01)
*F24H 3/06* (2006.01)
*F24H 3/04* (2006.01)
*F24H 9/20* (2006.01)
*H05B 3/20* (2006.01)
*H05B 3/30* (2006.01)
*B60H 1/22* (2006.01)

(52) U.S. Cl.
CPC ........... *F24H 3/0405* (2013.01); *F24H 3/062* (2013.01); *F24H 9/2014* (2013.01); *G01K 1/14* (2013.01); *G01K 1/16* (2013.01); *H05B 3/20* (2013.01); *H05B 3/30* (2013.01); *B60H 2001/2246* (2013.01); *G01K 2201/02* (2013.01)

(58) Field of Classification Search
CPC ......... F24H 3/062; F24H 9/2014; H05B 3/20; H05B 3/30; G01K 1/14; G01K 1/16; G01K 2201/02
USPC ................................. 237/5, 44, 45; 219/202
IPC .................. B60H 1/00,1/22; F24H 1/12, 3/04, F24H 3/06, 9/20; G01K 1/14, 1/16; H05B 3/20, 3/30
See application file for complete search history.

(56) References Cited

U.S. PATENT DOCUMENTS

| | | | | |
|---|---|---|---|---|
| 4,346,285 A | * | 8/1982 | Nakamura | F24H 1/121 165/181 |
| 5,727,118 A | * | 3/1998 | Roussel | F24H 1/121 392/494 |
| 5,780,811 A | * | 7/1998 | Kawamura | B01D 46/0063 219/205 |
| 6,556,779 B1 | * | 4/2003 | Stabile | H05B 3/20 219/541 |
| 2003/0135250 A1 | * | 7/2003 | Lauman | A61M 5/44 607/104 |
| 2005/0199610 A1 | * | 9/2005 | Ptasienski | H05B 3/26 219/543 |
| 2007/0166017 A1 | | 7/2007 | Kwon | |
| 2008/0000889 A1 | * | 1/2008 | Niederer | B60H 1/2221 219/205 |
| 2008/0037968 A1 | * | 2/2008 | Kaastra | F24H 1/121 392/465 |
| 2009/0060481 A1 | * | 3/2009 | Kaastra | F24H 1/121 392/471 |
| 2012/0237192 A1 | * | 9/2012 | Kominami | F28D 1/03 392/480 |
| 2013/0026151 A1 | * | 1/2013 | Adachi | B60H 1/2221 219/202 |
| 2013/0163969 A1 | * | 6/2013 | Bohlender | F24H 9/1872 392/465 |
| 2013/0220987 A1 | * | 8/2013 | Himeno | B60H 1/2221 219/202 |
| 2015/0014424 A1 | * | 1/2015 | Bytzek | B60H 1/2215 237/28 |
| 2015/0034626 A1 | * | 2/2015 | Kominami | H05B 1/0236 219/483 |
| 2016/0069588 A1 | * | 3/2016 | Kominami | H05B 3/50 236/35 |
| 2016/0368347 A1 | * | 12/2016 | Pierron | H05B 3/50 |

FOREIGN PATENT DOCUMENTS

| | | | |
|---|---|---|---|
| DE | 102014015586 B3 | 3/2016 | |
| GB | 2116809 A | 9/1983 | |
| JP | 2017053542 A | * 3/2017 | ............. G01K 13/02 |
| JP | 2017053543 A | * 3/2017 | ............. F28F 9/028 |

* cited by examiner

HEAT EXCHANGER AND VEHICLE HEATING DEVICE COMPRISING A HEAT EXCHANGER

CROSS-REFERENCE TO RELATED APPLICATIONS

This application represents the national stage entry of PCT International Application No. PCT/EP2016/072031 filed on Sep. 16, 2016 and claims priority to German Patent Application No. 10 2015 012 557.5 filed on Sep. 25, 2015. The contents of these applications are hereby incorporated by reference as if set forth in their entirety herein.

The invention relates to a heat exchanger and to a vehicle heating device comprising such a heat exchanger.

The present invention is based on the object of simplifying the construction of a heat exchanger having an integrated temperature sensor, which can be used in a vehicle heating device.

A heat exchanger having a temperature sensor for a vehicle heating device is described. The heat exchanger comprises the temperature sensor, a heat input surface, and an electrical heating element arranged on the heat input surface, and a heat output surface. The temperature sensor is arranged in a depression on the heat output surface. As a result of the temperature sensor being arranged in a depression on the heat output surface, free surfaces on that side of the heat exchanger body on which the electrical heating element is arranged do not need to be recessed. Accordingly, it is possible to select a larger heat input surface for a predetermined overall size and predetermined required heating capacity of the heat exchanger, as a result of which surface loading of ohmic strip conductors of the electrical heating element is reduced. Furthermore, a control device controlling the electrical heating element is customarily arranged on a heat exchanger side facing away from the electrical heating element, in order to reduce the heat loading of the electronics present in the control device. As a result of the temperature sensor being arranged in a depression on the heat output surface, the length of the lines required for making contact with the temperature sensor can accordingly be significantly reduced since said lines do not have to be guided around the heat exchanger. The comparatively short lines reduce the amount of space required and improve the electromagnetic compatibility by means of a smaller magnetic field. The temperature sensor can be, for example, a high-voltage temperature sensor. The heat input surface and the heat output surface can be surfaces of a heat exchanger body, which substantially determines, for example, an outer shape of the heat exchanger. A heat input surface of the heat exchanger body can denote a surface region of the heat exchanger body at which heat enters into or passes over the heat exchanger body during the operation of a vehicle heating device comprising the heat exchanger. The heat input surface can be, for example, a surface of the heat exchanger body on which an electrical heating element is arranged. The electrical heating element can be designed, for example, as a stratified heating element. A heat output surface of the heat exchanger can denote a surface of the heat exchanger body at which heat is transmitted to a medium which is to be heated during the operation of the heating device comprising the heat exchanger. The body of the heat exchanger can comprise a metallic material. The metallic material can be, for example, aluminum or an aluminum alloy which is readily heat-conductive. Current-conducting regions of the electrical heating element can be electrically insulated in relation to the heat input surface. It can be provided that an electrical insulation layer is applied directly to the heat input surface of the heat exchanger body. The expression "applied directly" can be understood in the present case as meaning in particular the application of the electrical insulation layer to the heat input surface of the heat exchanger with the aid of a thermal spraying or spray-on process. A thermal spraying process can be, for example, plasma spraying, cold gas spraying, flame spraying and/or suspension flame spraying. Alternatively, use can also be made of other coating processes which likewise permit direct application of an electrical insulation layer. It can be provided that an electrical heating layer of the electrical heating element is applied directly to the electrical insulation layer. The electrical heating layer can also be applied as a thin layer directly to the electrical insulation layer. The thermal spraying or spray-on processes already mentioned above can also be used for applying the electrical heating layer. It can be provided that the electrical insulation layer comprises a ceramic layer, in particular a ceramic layer composed of aluminum oxide. The electrical heating layer and the electrical insulation layer can be applied in a simple manner with the aid of the abovementioned spraying or spray-on process, wherein the electrical insulation layer can be fixed permanently to the heat exchanger body and the electrical heating layer can be fixed permanently to the electrical insulation layer. There can therefore be good heat transmission between the electrical heating layer, which can be applied to the electrical insulation layer, and the heat exchanger body in the region of the heat input surface. Furthermore, a ceramic layer is also connected in a mechanically stable manner to the surface of the heat exchanger body in order to compensate for stresses occurring during heating or cooling. This property can result in particular from at least similar thermal coefficients of expansion of the heat exchanger body and the insulating layer. There can also be sufficient mechanical stability between the electrical heating layer and the electrical insulation layer, which is designed, for example, as a ceramic layer, because of similar coefficients of expansion. It can be provided that the electrical heating layer comprises a metallic material, in particular nickel or a nickel alloy. Nickel or nickel alloys can easily be designed as sufficiently thermally stable ohmic heating resistors. It can be provided that the electrical heating layer is structured in a layer plane of the electrical heating layer and comprises at least two resistance heating elements which are independent of each other. In this manner, a plurality of resistance heating elements which are independent of one another and are designed as stratified heating elements can be directly applied together to the heat input surface of the heat exchanger body in a small number of manufacturing steps which are irrespective of the number of resistance heating elements. Individual resistance heating elements can be realized, for example, in the form of strip conductors in the electrical heating layer of the electrical heating element. The strip conductors can be arranged at a distance from one another and can each have dedicated electrical connection contacts. In order to simplify the electrical contact connection, the electrical connection contacts can be brought together and jointly connected to a voltage source. The electrical heating element can be supplied with electrical power, for example in a pulse-width-modulated form, in order to regulate the heating capacity. The electrical heating element can be designed as an electrical high-voltage heating element. Such an electrical high-voltage heating element can be supplied and operated with a high supply voltage. The high supply voltage can be, for example, at least 100 volts. The high supply voltage can lie within a voltage range which is referred to as the high-voltage range and can begin, for example, at 100 volts. The heat exchanger can be used, for example, as a heat exchanger of an electrical heating device which, for its part, can be used for an electric or hybrid vehicle. The electrical heating element can be suitable for operation in a high-voltage electrical system of an electric or hybrid vehicle. The electrical heating element can be suitable in particular for being operationally connected to the high-voltage electrical system of an electric or hybrid vehicle directly, that is to say without the interconnection of voltage converters, which, for example, limit the maximum voltage which can be supplied to the electrical heating element from the high-voltage electrical system. The depression on the heat output surface can be separated from the heat input surface by a material layer of the heat exchanger body. The material layer of the heat exchanger body can be distinguished, for example, by its small thickness. The small thickness of the separating material layer can be, for example, two to three times the thickness of the insulating layer. The material layer can be, for example, between 1.5 mm to 3.5 mm, preferably 2.5 mm. The depression can have a depth which, in relation to the thickness of the heat exchanger, corresponds at least to half the thickness of the heat exchanger. The depth can preferably be at least ⅔ of the thickness of the heat exchanger. Particularly preferably, the depth is ¾ of the thickness of the heat exchanger. The thickness of the heat exchanger perpendicularly to the heat input surface can be determined solely by the thickness of the heat exchanger body. The thickness of the heat exchanger can be provided, for example, by the shortest distance of the heat input surface from the heat output surface perpendicularly to the heat input surface.

It can be provided that the depression is designed as a blind hole. A blind hole can be produced in a simple manner during the production of the body of the heat exchanger. The blind hole can be produced, for example, as a bore in a working step independent of the production of the heat exchanger body or, if the heat exchanger body is produced in a casting process, can be provided during the casting by means of correspondingly shaped casting tools. Even if the blind hole is produced by correspondingly shaped casting tools, the blind hole can be finished off by means of drilling. Other methods known to a person skilled in the art for producing a blind hole are likewise possible. Both the diameter and the thickness of the material layer which separates the depression, which is designed as a blind hole, from the heat input surface are easily and precisely adjustable. Furthermore, the surface area over which the temperature sensor is connected to the heat exchanger body in a heat-conducting manner can be enlarged beyond a bottom surface of the blind hole. For example, a lateral surface of the blind hole can also be connected in a heat-conducting manner to the temperature sensor and can be used in addition to the bottom surface of the blind hole for thermally connecting the temperature sensor to the heat exchanger body. It can also be provided that the temperature sensor is cast in a sleeve which fills the depression. The sleeve which fills the depression can be formed, for example, from a ceramic material. The sleeve can be arranged in the depression, for example, in an integrally bonded or form-fitting or force-fitting manner. The sleeve can form, for example, an electrically insulating layer between the temperature sensor and the heat exchanger body. A wall thickness and bottom thickness of the sleeve can be dimensioned, for example, in such a manner that the required air and creep distances are maintained. The electrical heating element and the temperature sensor can therefore be regarded as electrically separate during operation. The sleeve can be arranged in the depression for example after formation of the depression, or can be produced directly in the depression. The sleeve can be produced directly in the depression, for example, with the aid of a thermal spraying or spray-on process. These processes have already been mentioned in conjunction with the electrical insulation layer. The sleeve together with the temperature sensor cast therein is preferably manufactured separately and inserted and fastened mechanically as an assembly in the depression. An additional adhesive bond between the sleeve and the heat exchanger body in the depression can be provided for improving the heat transfer and for fixing the sleeve.

It can be provided that the heat output surface is at least partially formed by fins. The fins can, for example, enlarge the heat output surface and for this purpose are oriented in particular substantially perpendicularly to the heat input surface. The fins can be manufactured separately from the rest of the heat exchanger body and can be connected to the rest of the heat exchanger body for example in an integrally bonded or force-fitting manner. Alternatively, it is also possible to manufacture the fins as an integral part of the heat exchanger body, wherein, for example, a casting or milling process which is known per se to a person skilled in the art can be used.

Furthermore, it is possible to provide a cover which, together with the heat output surface, defines at least one duct in which a medium which is to be heated can flow. The medium which is to be heated can be, for example, water or air. The duct can run, for example, at a constant distance from the heat input surface. The duct can have, for example, a meandering profile. The ducts can comprise, for example, at least one deflection of the medium which is to be heated, in order to increase the length of the duct in the vicinity of the heat input surface.

It can also be provided that the cover comprises an opening through which the temperature sensor is insertable into the depression. This permits easy installation of the temperature sensor in the depression, said installation being able to take place in particular after the actual manufacturing of the heat exchanger body and the fastening of the cover to the heat exchanger body. It can be provided that the opening is sealed off from the duct by a sealing device. This can prevent medium which is to be heated from escaping from the duct in the region of the temperature sensor. The sealing device can be designed, for example, as a weld seam. Weld seams are frequently already provided at other locations during the production of the heat exchanger, and therefore an additional weld seam does not require a manufacturing step which is completely different from the other manufacturing steps. It is also conceivable for the sealing device to be designed in the form of a metallic or rubbery sealing ring.

The above-described heat exchanger can be used as part of a vehicle heating device.

The invention will now be explained by way of example using preferred embodiments and with reference to the accompanying drawings, in which.

In the description below of the drawings, the same reference signs denote identical or comparable components.

Figure 1:
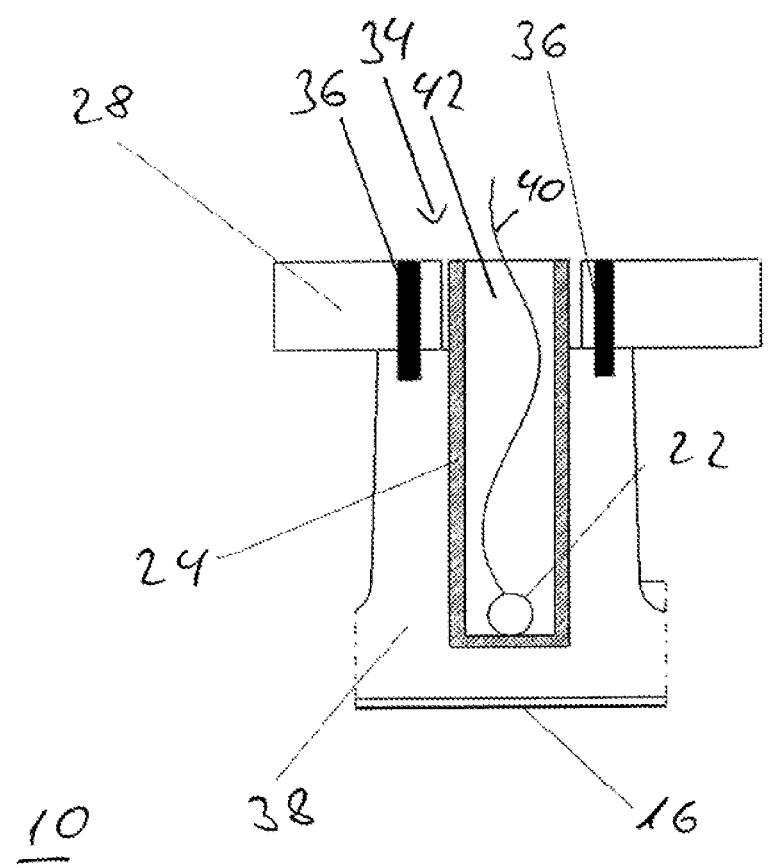
FIG. 1 shows a lateral sectional view of a heat exchanger with a temperature sensor.

FIG. 1 shows a lateral sectional view of a heat exchanger with a temperature sensor. A detail of a heat exchanger 10 can be seen in a lateral sectional view. The heat exchanger 10 comprises a heat exchanger body 38, an electrical heating element 16 arranged on the heat exchanger body 38, and a cover 28. The cover 28 is arranged on the opposite side of the heat exchanger body 38, as seen from the heating element 16. The cover 28 comprises an opening 34. The cover 28 and the heat exchanger body 38 are tightly connected to each other via a sealing device 36, and therefore medium which is to be heated is held back in the heat exchanger 10 between the heat exchanger body 38 and the cover 28 and cannot escape from the heat exchanger 10 in particular in the region of the opening 34 of the cover 28. The sealing device 36 can be designed, for example, as a weld seam or as a seal. The heat exchanger body 38 comprises a depression which is not denoted specifically in FIG. 1 and in which a sleeve 24 is accommodated. The sleeve 24 can be composed, for example, of a ceramic material. The sleeve 24 can accommodate a temperature sensor 22 which can be cast with the aid of a casting material 42 in the interior of the sleeve 24, in particular in a bottom region of the sleeve 24. An electrical contact connection 40 serves for connecting the temperature sensor 22 to an electric controller (not illustrated in FIG. 1). The ceramic sleeve 24 can be inserted through the opening 34 in the cover 28 into the depression (not denoted specifically) in the heat exchanger body 38. The sleeve 24 can be connected to the heat exchanger body 38, for example, in a form-fitting or force-fitting or integrally bonded manner. The sleeve 24 can be adhesively bonded in the depression in order to provide for fixing and a particularly readily heat-conducting connection between the heat exchanger body 38 and the sleeve. Alternatively, the sleeve 24 can also be produced by direct application in the depression of the heat exchanger body 38, wherein use can be made of a thermal spraying or spray-on process which is known per se to a person skilled in the art. The casting material 42 can be, for example, a readily heat-conducting resin. The sleeve 24 can insulate the temperature sensor 22 electrically in relation to the rest of heat exchanger 10. The casting material 42 can contribute to the electrical insulation. The electrical heating element 16 can be fastened to the heat exchanger body 38 or can be produced directly on the heat exchanger body 38 by direct application using a thermal spraying or spray-on process.

Figure 2:
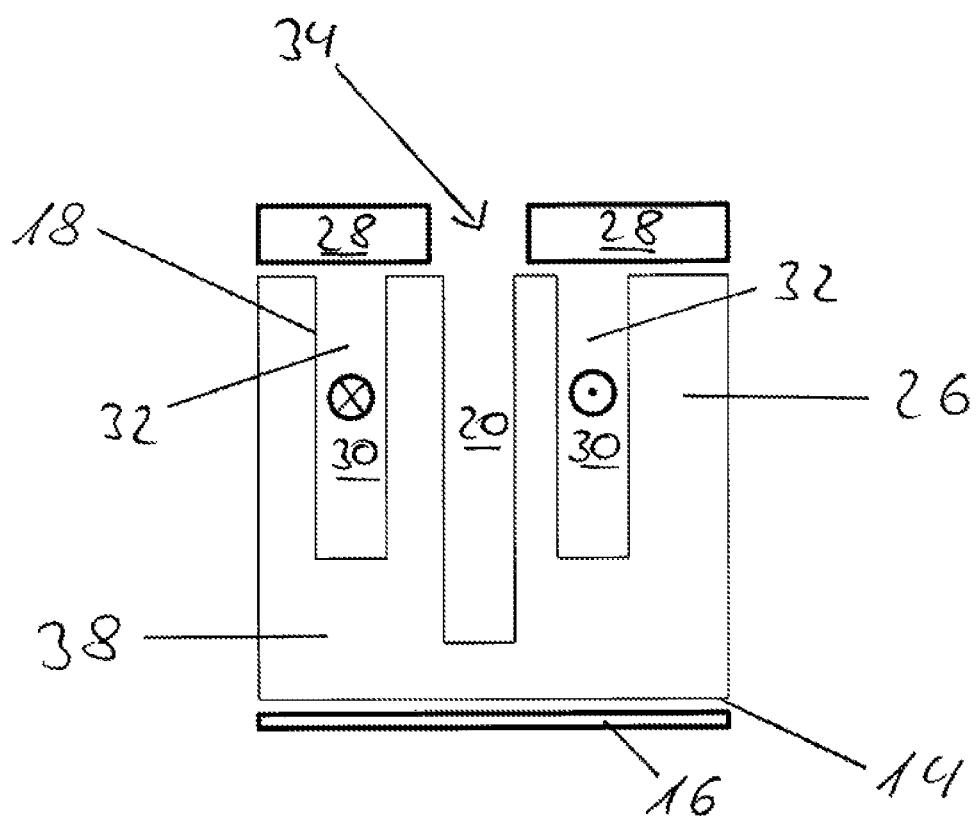
FIG. 2 shows a lateral sectional view of a heat exchanger without a temperature sensor arranged therein.

FIG. 2 shows a lateral sectional view of a heat exchanger without a temperature sensor. The electrical heating element 16 is arranged on a heat input surface 14, wherein the distance which can be seen in FIG. 2 is included in the view only for the sake of better clarity. The cover 28 is arranged on the opposite side of the heat exchanger body 38, said cover having the opening 34 through which access into a depression 20 is possible. The distance between the heat exchanger body 38 and the cover 28 also serves only for better clarity. The depression 20 is provided for accommodating the temperature sensor 22 which is already known from FIG. 1. The heat exchanger body 38 comprises fins 26 which extend substantially perpendicularly to the heat input surface 14 and define at least one duct 30 in which a medium 32 which is to be heated flows. A flow direction of the medium 32 is indicated by means of the symbols. In the view selected in FIG. 2, the flow direction indicated runs perpendicularly to the plane of the sheet. The sealing device 36, which is illustrated in FIG. 1 and is not illustrated in FIG. 2, provides a seal between the cover 28 and the heat exchanger body 38 in such a manner that the medium 32 which is to be heated is effectively prevented from escaping at the opening 34 of the cover 28. Between the depression 20 and the heat input surface 14 there is a relatively thin material layer of the heat exchanger body 38, and therefore sensing of the temperature by means of the temperature sensor which is to be arranged in the depression 20 corresponds substantially to the temperature of the heating element 16 because of the good heat conductivity of the heat exchanger body 38. The fins 26 can provide a multiple deflection of the medium 32 which is to be heated, and therefore the effective length of the at least one duct 30 is increased in the region of the heat input surface 14.

Figure 3:
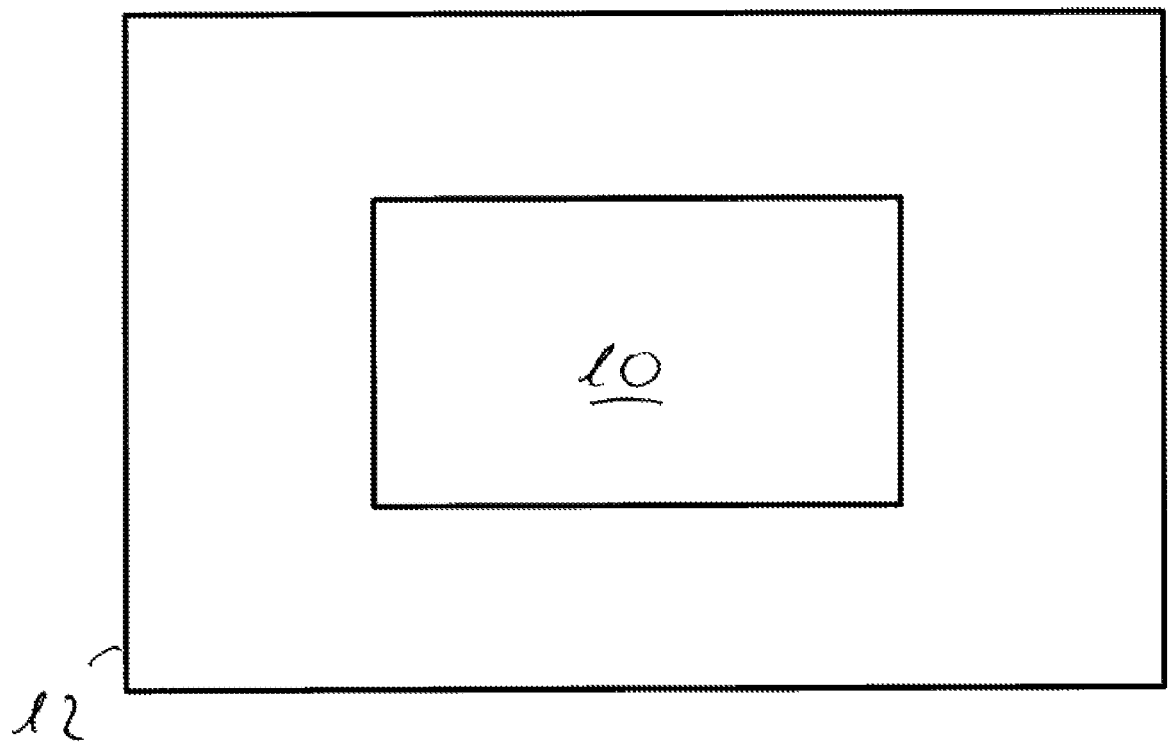
FIG. 3 shows a symbolic illustration of a vehicle heating device comprising a heat exchanger.

FIG. 3 shows a symbolic illustration of a vehicle heating device comprising a heat exchanger. The vehicle heating device 12 illustrated in FIG. 3 comprises a heat exchanger 10 as described by way of example in conjunction with FIGS. 1 and 2. In addition to the heat exchanger 10, the vehicle heating device 12, which is illustrated symbolically in FIG. 3, can also comprise, for example, a control device (not illustrated).

Figure 4:
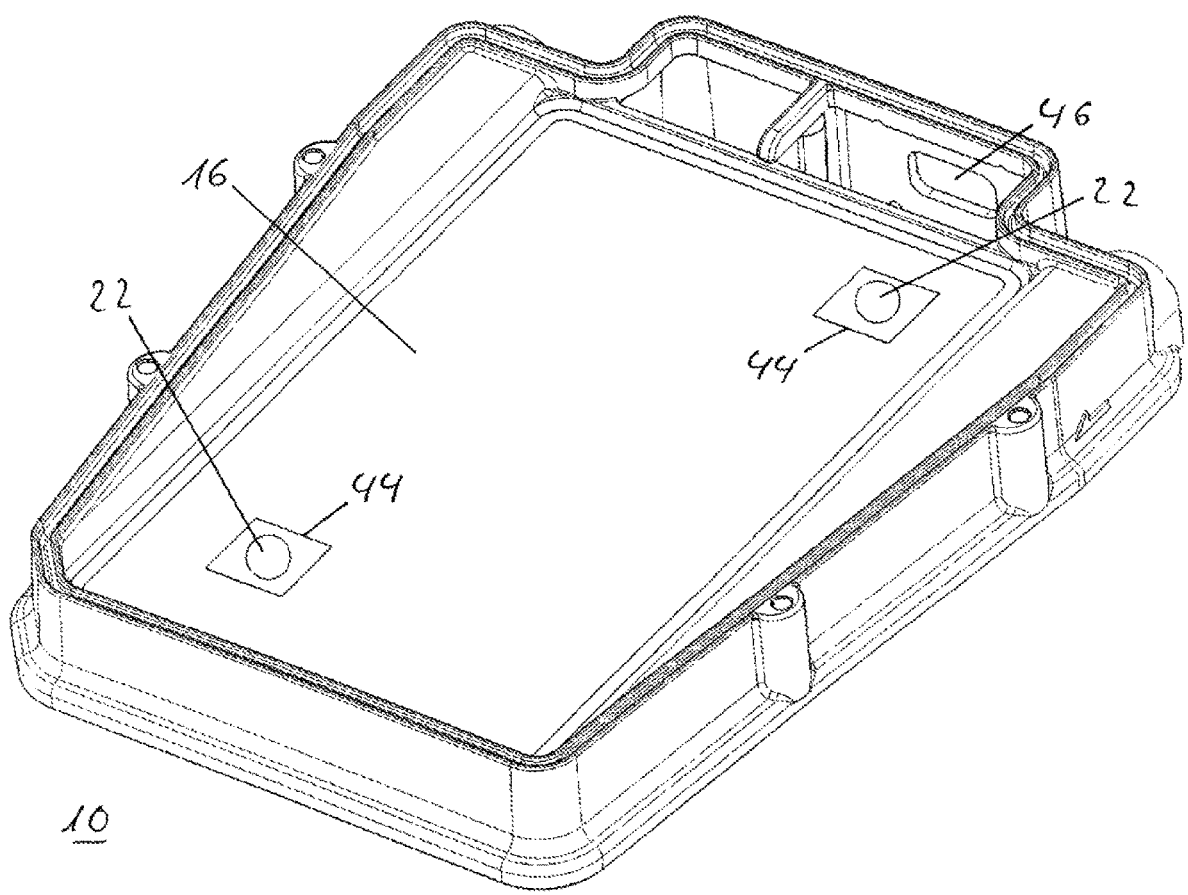
FIG. 4 shows a three-dimensional external view of a heat exchanger provided with recesses on the heating element.

FIG. 4 shows a three-dimensional external view of a heat exchanger provided with recesses on the heating element. The heat exchanger 10 which is illustrated in FIG. 4 is similar to the heat exchangers 10 described in conjunction with FIGS. 1 and 2. For example, the basic shape and the external dimensions of the heat exchanger illustrated in FIG. 4 can also be provided in an identical manner in the case of the heat exchangers 10 described in conjunction with FIGS. 1 and 2. However, in the case of the heat exchanger 10 illustrated in FIG. 4, the temperature sensor 22 is arranged in recesses 44 which lie on that side of the heat exchanger 10 on which the electrical heating element 16 is also arranged. Accordingly, the recesses 44 reduce the surface area available on the heat exchanger 10 for the electrical heating element 16 and therefore effectively reduce the heat input surface. The temperature sensors 22 are connected in a heat-conducting manner to the heat exchanger 10 in a planar manner in the plane of the recesses 44. A control device (not illustrated in FIG. 4) is customarily arranged on the rear side (not visible in FIG. 4) of the heat exchanger 10. An electrical contact connection of the temperature sensors 22 is accordingly required via a cable passage 46, and therefore long lines have to be guided around the heat exchanger 10. This special arrangement of the control device on that side of the heat exchanger 10 which lies opposite the heating element 16 can also be provided in conjunction with the heat exchangers 10 described in FIGS. 1 and 2.

The features of the invention which are disclosed in the above description, in the drawings and in the claims may be essential both individually and in any desired combination for the purpose of implementing the invention.

LIST OF REFERENCE SIGNS

10 Heat exchanger
12 Vehicle heating device
14 Heat input surface
16 Heating element
18 Heat output surface
20 Depression
22 Temperature sensor
24 Sleeve
26 Fins
28 Cover
30 Duct
32 Medium 34 Opening
36 Sealing device
38 Heat exchanger body
40 Contact connection
42 Casting material
44 Recess
46 Cable passage

The invention claimed is:

1. A heat exchanger having a temperature sensor for a vehicle heating device, wherein the heat exchanger comprises
    the temperature sensor,
    a heat input surface,
    an electrical heating element controlled by a control device and arranged on the heat input surface,
    wherein the control device is arranged on a heat exchanger side facing away from and opposite to the electrical heating element,
    a heat output surface, and
    wherein the temperature sensor is arranged in a depression on the heat output surface, wherein the depression is formed in a direction of thickness of the heat exchanger perpendicular to the heat input surface.

2. The heat exchanger as claimed in claim 1, wherein the depression is designed as a blind hole.

3. The heat exchanger as claimed in claim 1, wherein the temperature sensor is cast in a sleeve which fills the depression.

4. The heat exchanger as claimed in claim 3, wherein the sleeve is formed from a ceramic material.

5. The heat exchanger as claimed in claim 3, wherein the sleeve is arranged in the depression in an integrally bonded and/or form-fitting and/or force-fitting manner.

6. The heat exchanger as claimed in claim 1, wherein the heat output surface is at least partially formed by fins.

7. The heat exchanger as claimed in claim 1, wherein a cover is provided which, together with the heat output surface, defines at least one duct in which a medium which is to be heated can flow.

8. The heat exchanger as claimed in claim 7, wherein the cover comprises an opening through which the temperature sensor is insertable into the depression.

9. The heat exchanger as claimed in claim 8, wherein the opening is separated from the duct by a sealing device.

10. A vehicle heating device comprising a heat exchanger as claimed in claim 1.

* * * * *